United States Patent [19]

Groth

[11] Patent Number: 4,566,831

[45] Date of Patent: Jan. 28, 1986

[54] SHOCK ABSORBENT DUNNAGE DEVICE

[75] Inventor: John P. Groth, Stillwater, Minn.

[73] Assignee: Andersen Corporation, Bayport, Minn.

[21] Appl. No.: 117,782

[22] Filed: Feb. 1, 1980

[51] Int. Cl.⁴ .............................................. B60P 7/14
[52] U.S. Cl. .................................. 410/117; 206/584; 410/119
[58] Field of Search ............... 410/121, 126, 155, 119, 410/140, 117; 428/72, 315; 206/584, 521, 593, 814, 819; 53/450

[56] References Cited

U.S. PATENT DOCUMENTS

| | | | |
|---|---|---|---|
| 2,657,158 | 10/1953 | Gerard | 206/584 |
| 3,074,543 | 1/1963 | Stanley | 206/584 |
| 3,145,853 | 8/1964 | Langenberg | 410/125 |
| 3,199,689 | 8/1965 | Feldkamp | 410/119 |
| 3,442,402 | 5/1969 | Baxter | 410/119 |
| 3,452,505 | 7/1969 | Hoag | 53/29 |
| 3,462,007 | 8/1969 | Heider et al. | 206/584 |
| 3,515,267 | 6/1970 | Rocca et al. | 206/46 |
| 3,554,135 | 1/1971 | Duvall et al. | 410/119 |
| 3,606,726 | 9/1971 | Spertus et al. | 53/28 |
| 3,987,736 | 10/1976 | Miller | 105/491 |

FOREIGN PATENT DOCUMENTS 895242  5/1962  United Kingdom .

Primary Examiner—Richard A. Bertsch
Attorney, Agent, or Firm—Merchant, Gould, Smith, Edell, Welter & Schmidt

[57] ABSTRACT

An improved shock absorbing dunnage device particularly suited for use in tightly packing railroad box car loads is disclosed. A sealed outer envelope containing a filler of wooden particulate material having reduced moisture content provides a simple, highly effective and cost efficient dunnage device.

8 Claims, 4 Drawing Figures

SHOCK ABSORBENT DUNNAGE DEVICE

TECHNICAL FIELD

This invention relates broadly to dunnage devices. More particularly, this invention relates to such dunnage devices used to cushion fragile loads such as windows and glass bearing products from impact during shipping by railroad car.

BACKGROUND OF PRIOR ART

Shippers of bulky fragile products such as glass containing windows and doors have long been hampered by the unavailability of an effective shock absorbing dunnage material that is readily available or simple to fabricate, easy to use, relatively inexpensive and readily disposable for one-way shipping. This need has been particularly acute for those shipping their products by railroad car, where the operative nature of the train during starting, stopping and car-coupling operations subjects the railroad car to high impact forces and its load to extreme shift-inducing forces during such operations. Such loads are also continuously subjected to smaller shift-inducing and impact forces during normal traveling movement of the railroad car when it rocks as a result of encountering uneven railroad tracks, and when rolling over gaps or switching voids in the railroad tracks.

To minimize damage to the railroad car load, it has been a common practice to pack the contents of the car as tightly as possible, filling in any voids and empty portions between the contents being shipped, to prevent shifting of the entire load and relative movement of the individual pieces or cartons of the load as the railroad car is subjected to the impact and normal travel jostling forces. While a number of various dunnage materials, both raw materials and of the manufactured variety, have been used for such purposes, they have generally been unacceptable as universal dunnage devices for a number of different reasons.

For example, it is advantageous for a manufacturer to dispose of the waste products of his plant such as paper products, wood products, fabrics, etc. for dunnage purposes. Direct use of such waste materials for dunnage purposes has generally proved to be impractical. While it has long been known that sawdust and wood shavings provide excellent shock absorption dunnage material properties, it is generally unworkable or impractical to shovel or blow such materials into a railroad car during loading thereof so as to fill the voids, and provides an unmanageable environmental mess and safety hazard during unloading of the car. Further, it has been found that the wood shavings or sawdust when so used as a loose dunnage material, have a tendency to settle due to vibration and impact shocks during motion of the car, which again leaves damaging voids within the railroad car. Fabric waste by-products are generally not available in the quantities needed for high volume railroad car shipping, and do not typically have the shock absorbent properties required for such purposes unless very tightly packed. Such tight packing creates an unmanageable car-loading situation. Similarly, paper waste products in, for example, shredded or crumpled form, have been generally unacceptable as effective or practical dunnage materials, for reasons already stated with respect to usage of the sawdust and fabric products.

Many shippers have resorted to filling railroad car voids with layers or corrugations of cardboard. While this method has met with limited success, it is often very difficult if not impossible to completely fill the voids within the railroad car with the cardboard to that extent required to ensure non-movement and cushioning of the load. Also, when the physical make-up of the carton sizes of a load vary from car to car, so do the dunnage size requirements for the cardboard, thus requiring time-consuming fitting and cutting operations by the packers. Further, when heavy loads are involved, the cushioning and shock absorption qualities of the cardboard offers limited protection against the large impact forces involved during shipment. Other disadvantages for the use of cardboard include potentially significant costs to the manufacturer, of the general inability to re-use the cardboard for subsequent packing operations at the receiving terminal, and disposal of the cardboard at the receiving terminal.

In an effort to overcome such above-described disadvantages of raw or waste materials when used directly for dunnage purposes, a number of manufactured dunnage devices have been introduced. Such dunnage devices can be generally divided into two groups: (1) pneumatic shock absorption devices; and (2) particulate shock absorption material containing devices.

Examples of the pneumatic dunnage devices are disclosed by Miller U.S. Pat. No. 3,987,736 and Feldkamp U.S. Pat. No. 3,199,689. The pneumatic dunnage devices are basically inflatable balloons or bags that provide cushioning upon impact. Since such devices depend entirely for their cushioning ability upon the airtight nature of the pneumatic portion of the device, it is important for such devices to include a protective external structure for shielding the inflatable member from puncture. Such construction increases both the complexity and cost of the device and makes it generally impractical as a disposable item for one-way shipping requirements.

Typical of the particulate shock absorption material containing dunnage devices are those described by La Rocca et al U.S. Pat. No. 3,515,267, by Heider et al U.S. Pat. No. 3,462,007 and by Spertus et al U.S. Pat. No. 3,606,726. The dunnage devices described by these patents generally comprise an outer envelope housing a shock absorbing particulate material. In the devices described by La Rocca and Heider, the filler material comprises a bead-like manufactured material such as polystyrene, vinyl, foam rubber or the like. Since such materials are generally expensive when used in significant quantities, the cost of such dunnage devices makes such devices generally impractical as disposable one-time-use items. Spertus et al discloses a dunnage device that uses waste products readily available to the manufacturer for the dunnage device filler material. The bag housing the filler material is perforated to allow free flow of air through the bag when subjected to an impact force. The dunnage device described by Spertus offers significant cost advantages to a manufacturer over such devices which require manufactured or purchased filler material. However, when used with particulate filler materials having a relatively high moisture content, the filler material within a dunnage device such as described by Spertus may freeze in subzero temperatures, rendering the device ineffective as a shock absorption device.

The present invention offers an improved dunnage device that fills a need in the art for a simple, effective, inexpensive, easy to use and readily disposable or, alternatively, re-usable dunnage device, the use of which is not limited by extreme temperature variations.

SUMMARY OF THE INVENTION

The present invention comprises an improved dunnage bag of the type particularly suitable for use in tightly packing loads within railroad box cars. The dunnage device includes an elongate outer envelope or bag-member having a tube-like shape sealed at both ends to form a relatively air-tight container. The bag member contains a measure of relatively dry particulate wood by-product filler material. The inner cavity of the bag-member is loosely filled with particulate filler material to approximately 70 to 90 percent of its volume; whereby the outer envelope can be pliably deformed to an extent sufficient for enabling tight packing of the dunnage device within oddly shaped voids in a load being packed, while maintaining excellent shock absorption properties and while offering strong resistance to flattening of the packed shape of the envelope when subjected to high impact forces.

In a preferred embodiment of the dunnage device, the particulate filler material comprises sawdust or wood shavings and has a moisture content sufficiently low so as to avoid freezing of the filler material when subjected to freezing temperatures. According to a preferred embodiment of the invention, the particulate filler material has a moisture content of less than 25 percent, and preferably within the range of zero to 20 percent.

While the present invention will be described with respect to a preferred configuration of the device, and with respect to preferred materials and shapes of construction, it will be understood that other configurations, materials and shapes could be used for constructing the dunnage device, without departing from the spirit and scope of this invention. Various advantages and features of novelty which characterize the invention are pointed out with particularity in the claims annexed hereto and which form a part hereof. However, for a better understanding of the invention and its advantages obtained by its use, reference should be made to the Drawing which forms a further part hereof and to the accompanying descriptive matter in which there is illustrated and described a preferred embodiment of the invention.

BRIEF DESCRIPTION OF THE DRAWING

Referring to the Drawing, wherein like numerals represent like parts throughout the several views.

DETAILED DESCRIPTION OF THE INVENTION

Referring to the Figures, there is generally illustrated at 10 a shock-absorbing dunnage device of a configuration and shape particularly suitable for use in packing loads to be shipped in railroad box cars, wherein the dunnage device is used to fill voids between the articles or cartons comprising the load. In the preferred embodiment, the dunnage device 10 includes a continuous outer envelope or bag member 12 made of a flexible sheet material. The outer envelope or bag member 12 may comprise any appropriate flexible material suitable for containing the filler material to be hereinafter described and for withstanding distributed impact forces imparted thereto in operative use, and is preferably of a plastic or polyethylene material. In the preferred embodiment of the invention, polyethylene tube stock material of 4 mil. thickness has been found to perform satisfactorily.

Figure 1:
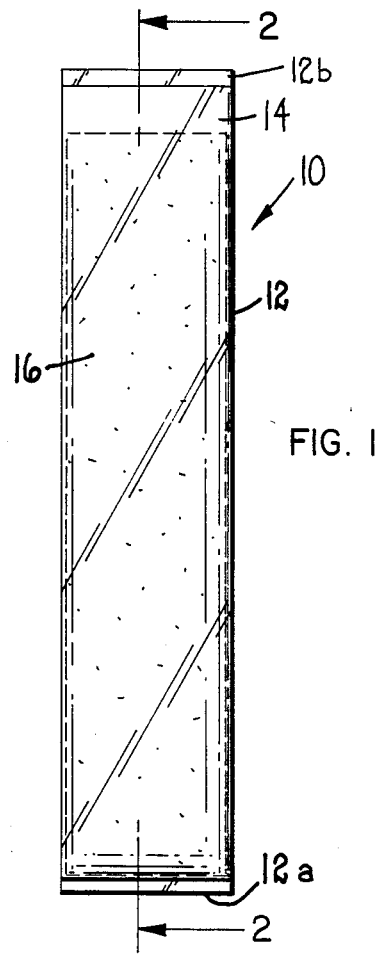
FIG. 1 is a front view of a dunnage device constructed according to the principles of this invention.
Figure 2:
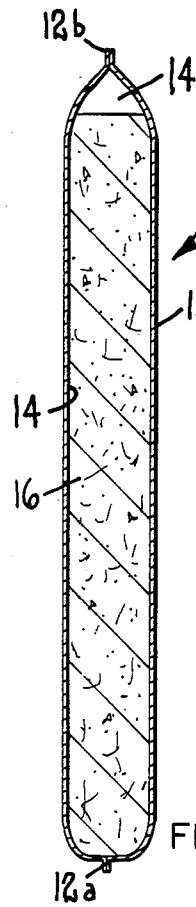
FIG. 2 is a cross-sectional view of the dunnage device disclosed in FIG. 1, generally viewed along the line 2—2 of FIG. 1.
Figure 3:
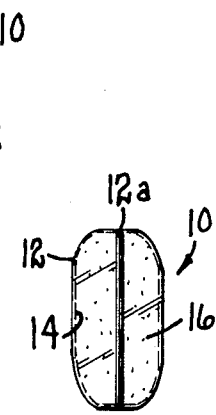
FIG. 3 is a bottom plan view of the dunnage device disclosed in FIG. 1.
Figure 4:
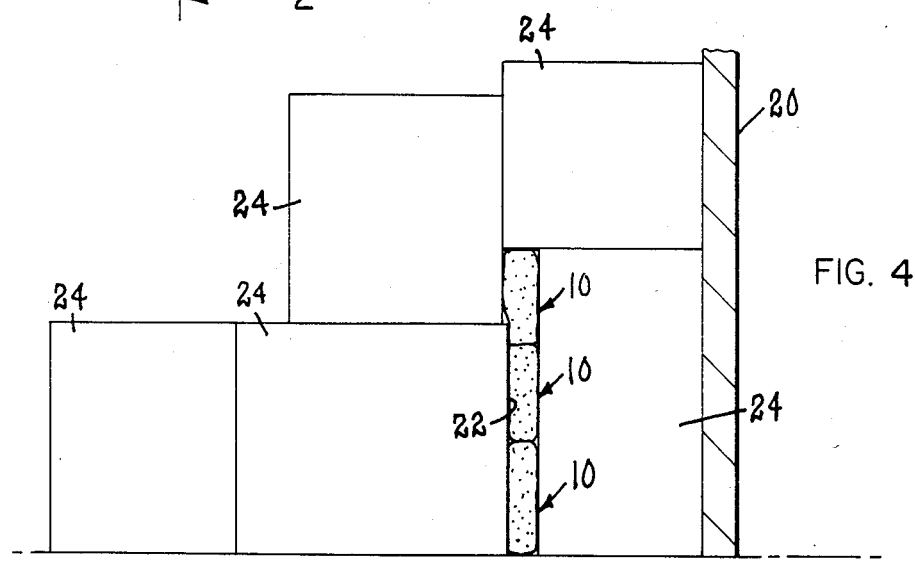
FIG. 4 is a diagrammatic view of an example of usage of the dunnage device disclosed in FIGS. 1–3 for filling a void between otherwise tightly packed articles within a box car load.

The envelope or bag member 12 is configured in the shape of an elongate tube or casing, as illustrated in FIGS. 1–3. This shape has been found to be particularly useful for packing narrow elongate voids between large cartons and boxes in a box car load, such as illustrated in FIG. 4. While it will be understood that many configurations, sizes and shapes of the dunnage bag can be envisioned within the spirit and scope of this invention, the dimensions of the filled envelope 12 as illustrated in the Figures of the preferred embodiment are six inches in diameter and approximately three feet in longitudinal length. The longitudinally opposed ends of the outer envelope 12 are sealed by an appropriate method. In the preferred construction of the dunnage device 10, the ends of the polyethylene envelope are heat-sealed. In practice, the bottom end of a continuous length of outer envelope tubing material is heat-sealed, defining a lower boundary 12a for the internal cavity 14 of the bag member 12. A measure of particulate filler material 16 is then deposited through the open upper end of the bag member 12 to the desired height, after which the upper end 12b of the bag member 12 is sealed, to retainably hold the particulate filler material 16 within the inner cavity 14.

While other materials may be employed for the filler material 16, the preferred materials comprise wooden waste products typically found in a factory or milling facility, such as sawdust or wood shavings. Advantages of using such filler materials are that since they are waste products of the manufacturer, they represent no added cost to him, usage of such waste products in a dunnage device capacity releaves the manufacturer of the burden of disposing of such waste products, and the sawdust or wood shavings can be easily salvaged, used or sold at the rail car destination when the car is unloaded. The inner cavity 14 of the bag member 12 is preferably filled by the particulate filler material 16 to within 70 percent to 90 percent of its volume. While such filling figures will vary depending upon the particular shape and configuration of the outer envelope 12, this range of values has been found to enable the user of the dunnage bag 10 to deform to some extent the outer shape of the bag member 12 for enabling tight packing of the dunnage device 10 within oddly shaped voids or cavities within the load. At the same time, the inner cavity 14 of the bag member 12 is packed tightly enough so as to provide for adequate absorption of distributed shock or impact forces imparted to the bag during shipping conditions, and for preventing flattening of the bag member 12 when such impact forces are imparted to the bag. Due to the fact that the particulate filler material 16 is distributed within a sealed cavity 14, there is a greater tendency for the wooden shavings or sawdust to act as free-flowing bodies within the cavity 14, than would be the case if the outer envelope 12 were perforated. The sealed nature of the bag member 12 also provides the dunnage device 10 with some pneumatic shock absorption qualities; however, the inner cavity 14 of the bag member 12 is not sealed under any significant positive air pressure as is typically the case with the so-called pneumatic dunnage devices.

In the preferred method of constructing the dunnage device 10, it has been found advantageous to use a particulate filler material 16 having a reduced moisture content sufficient to prevent freezing of the filler material when subjected to sub zero temperatures. While a particulate filler material such as sawdust or wood shavings may not be particularly susceptible to freezing, even with a higher moisture content, when it is loosely packed within a dunnage device, when such a dunnage device is tightly packed so as to fill voids between articles packed within a box car, and as the load tends to shift with motion of the railroad car and with impact forces subjected thereto, the filler contents 16 can become very tightly packed within the inner cavity 14 of the bag 12. In such instances, freezing of the particulate matter 16 is much more likely if its moisture content is high than if it is relatively low. For this reason, it has been found that a moisture content for the filler material 16 of less than 25 percent is preferable, and that the preferred range of moisture content for the filler material would lie within the range of zero to 20 percent. Kiln dried lumber having a low moisture content of approximately 12 to 15 percent has been found to provide excellent results in a dunnage device such as described in FIGS. 1-3. A low moisture content for the filler material also improves the free-floating nature of the particulate filler material and helps to minimize settling and compaction of the filler material within the inner cavity 14 under vibratory shipping conditions.

As discussed above, the particular configuration and shape of the dunnage device 10 can be varied to suit the particular shipping conditions and requirements. An example of how the dunnage device 10 having the particular tubular configuration illustrated in FIGS. 1-3 can be used for tightly packing a load of cartons within a box car (generally designated at 20) is illustrated in FIG. 4. Referring to FIG. 4, it will be noted that three dunnage devices 10 of the nature above described have been axially stacked upon one another to fill a void 22 between otherwise tightly packed articles or cartons 24 within a box car 20.

It is believed that the invention, its mode of operation, construction and assembly and many of its advantages should be readily understood from the foregoing without further description. While a particular embodiment of the invention has been described, other modifications of the invention will be apparent to those skilled in the art in light of the foregoing description. This description is intended to provide a specific example of an embodiment which clearly discloses the present invention. Accordingly, the invention is not limited to the described embodiment or to the use of specific elements therein. All alternative modifications and variations of the present invention which fall within the spirit and broad scope of the appended claims are covered.

What is claimed is:

1. An improved dunnage bag device for filling void areas between articles being packed for shipment comprising:
   (a) an outer sealed envelope of thin flexible material, defining an internal cavity; and
   (b) particulate shock absorption filler material comprising wooden by-products such as sawdust or wood shavings loosely packed within and filling at least 70 percent of said internal cavity, said filler material having a moisture content of less than or equal to 20 percent; wherein said bag is resiliently responsive to impact forces applied thereto regardless of extended exposure of the bag to freezing temperatures.

2. The dunnage device as described in claim 1, wherein the pressure within said internal cavity is substantially equal to or less than that atmospheric pressure external of said envelope.

3. The dunnage device as described in claim 1, wherein the moisture content of said particulate filler material is less than or equal to 15 percent.

4. The dunnage device as described in claim 3, wherein said particulate filler material fills approximately 80 to 90 percent of the volume of said internal cavity.

5. An improved dunnage bag of the type particularly suitable for use in tightly packing loads having multiple irregular void areas between items of the load, for shipment within railroad box cars, comprising:
   (a) an elongate tube-like outer envelope of thin flexible material;
   (b) means for sealing longitudinally opposing ends of said envelope, defining a sealed internal cavity within said envelope; and
   (c) a loosely packed mass of particulate wood filler material confined within said internal cavity and filling approximately 70 to 90 percent of said internal cavity, said particulate material having a moisture content of less than 15 percent; wherein said filler material freely moves within said internal cavity so as to allow for slight deformation of said envelope for packing purposes, but has sufficient confined mass to absorb distributed impact forces applied to said envelope without permitting flattening collapse of said envelope even when said bag and filler material are exposed to freezing temperatures for extended periods of time.

6. A dunnage bag as recited in claim 5, wherein the pressure within said internal cavity is substantially equal to or less than that atmospheric pressure external of said outer envelope.

7. The dunnage bag as recited in claim 6, wherein said outer envelope comprises a tube-like polyethylene material.

8. The dunnage bag as recited in claim 6, wherein said particulate wooden filler material comprises sawdust.

* * * * *